Oct. 7, 1941.    A. C. DE HOFFMANN    2,257,789
WINDSHIELD WIPER BLADE
Filed April 8, 1939
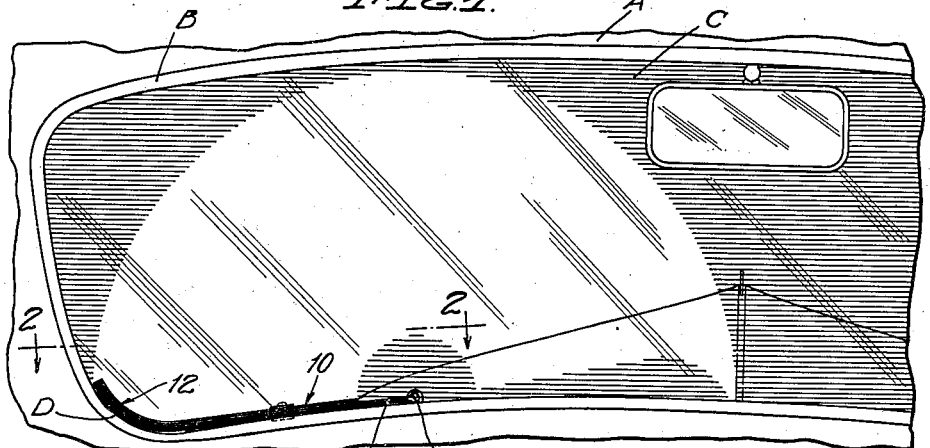
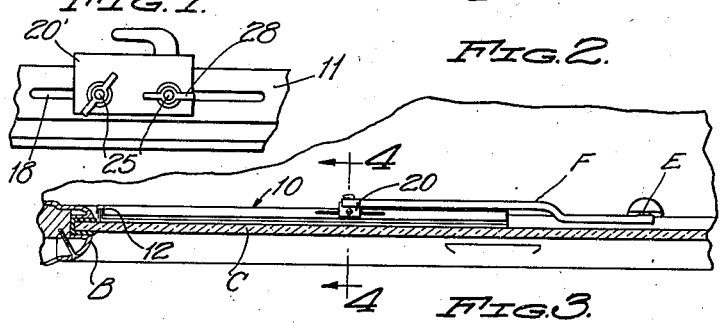
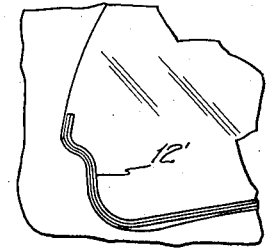
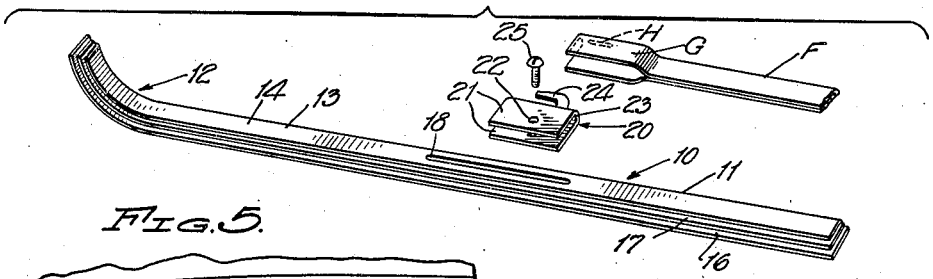
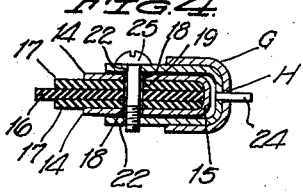
ALEXANDER C. DE HOFFMANN.
INVENTOR.
BY *Ely H Pattison*
ATTORNEYS.

Patented Oct. 7, 1941

2,257,789

UNITED STATES PATENT OFFICE 2,257,789

WINDSHIELD WIPER BLADE

Alexander C. de Hoffmann, New York, N. Y.

Application April 8, 1939, Serial No. 266,732

2 Claims. (Cl. 15—255)

This invention relates to improvements in windshield wipers, and although it is designed particularly for use upon automobile windshields, the same may also be used upon the windshields of airplanes, street cars, locomotive cabs and the like.

In the modern style automobile windshield, the lower corners of the windshield frame are rounded and the straight wiper blade swings from an axis at the base of the windshield. By the use of a wiper blade which is straight throughout its length, it is impossible for the blade to wipe clean the corner areas of the glass windshield, which results in restricting the optical vision of the operator of an automobile when driving in snowy and rainy weather. It is apparent that if the radius of the arcuate path of the wiper blade could be increased a fraction of an inch, the range of optical vision of the operator of an automobile would be proportionately increased, thus affording a more sweeping view of the road and scenery ahead. It is therefore the main object of this invention to provide a novel oscillatable windshield wiper blade which is capable of cleaning a maximum area of the glass windshield by shaping the outer extremity of the blade to substantially conform to the shape of the corner of the windshield.

Another feature of the invention is to provide a windshield wiper blade which is provided with an adjustable attaching means to facilitate the attachment of the same to different length oscillatable supporting arms to obtain the proper working radius of the outer extremity of the wiper blade relative to the pivotal axis of the oscillatable supporting arm.

A further object of the invention is the provision of a windshield wiper blade having the above mentioned features, which is inexpensive of construction, and easy to adjustably attach to the oscillatable supporting arm of a windshield wiper device.

Other features of the invention will become apparent as the following specification is read in conjunction with the accompanying drawing, in which:

Figure 1 is a fragmentary inside front elevational view of an automobile windshield showing my improved wiper blade in use thereon.

Figure 2 is an enlarged fragmentary horizontal sectional view on the line 2—2 of Figure 1.

Figure 3 is a collective perspective view of the wiper blade and its attaching means in separated position relative to the supporting arm.

Figure 4 is an enlarged transverse sectional view through the upper blade taken on the line 4—4 of Fig. 2.

Figure 5 is a fragmentary inside front elevational view of an automobile windshield illustrating in full lines a wiper blade provided with a double curve extremity and showing in dot and dash lines the arc which it traverses.

Figure 6 is an elevational view of a modification wherein the end of the wiper is of stepped design.

Figure 7 is an elevational view of a modified form of adjustable attaching means for the wiper and arm.

Referring to the drawing by reference characters, the numeral 10 designates my improved windshield wiper blade in its entirety and which includes an elongated body portion 11 having an outer wiper extension portion 12 at the outer end thereof. The wiper 11 comprises a metal channel member 13 having spaced opposed parallel walls 14—14, and a connecting wall 15. The outer end of the channel member 13 is bent to the desired angle to substantially fit into the corner of a windshield as will be hereinafter fully explained, and in Figures 1 to 4 inclusive the angular extension 12 is in the form of a curve, although it may be of other shapes as will be hereinafter described. Held clamped between the walls 14—14 are flat rubber strips similar to those of a squeegee, and in this instance three of such strips have been shown, the intermediate strip 16 being wider than the outer strips 17—17. One of the side edges of all of the strips project beyond the free edges of the walls 14—14 to provide the wiping edge, and which wiping edge is in the same plane throughout the entire length of the wiper 10 so that both the straight portion and the angular portion of the wiping edge flatly contacts the glass surface of the windshield over which it is adapted to pass. The walls 14—14 of the channel member 11 along the straight portion thereof are provided with registering elongated slots 18—18 which register with similar slots 19 provided in the wiper strips 16 and 17.

Fitting over the closed side edge of the channel member 13 is an adjustable attaching clip 20 which is of U-shape in cross section and which includes opposed resilient side walls 21—21 having aligned openings 22 therein for registration with the slots 18 and 19, one of the openings 22 being screw threaded. Suitably attached to the connecting wall 23 of the attaching member 20 is an outwardly extending hook 24. A clamping screw 25 passes through one of the openings 22, through the registering slots 18 and 19 and threads into the other opening 20 as best illustrated in Figure 4 of the drawing. Thus by loosening the screw 25, the attaching member 20 may be slid lengthwise along the body portion 11 of the wiper blade 10 and by tightening the screw 25, the resilient walls 21—21 may be brought into clamping engagement with opposite sides of the channel member 13.

In Figures 1 and 2 of the drawing, I have illustrated an automobile windshield A which includes a frame B in which the glass windshield panel C is mounted. In Figure 1, the lower corner D of the windshield frame is curved and the angular wiper extension 12 of the wiper blade 10 is substantially of the same curvature so that it will fit into the rounded corner C as illustrated in Figure 1. Pivotally mounted forward of the windshield A as at E is the conventional windshield wiper arm F which is swung about the pivot E by the usual windshield wiper motor (not shown). The outer end of the arm F is provided with an enlarged head G which is of U-shape in cross section, and the closed side is formed with an elongated slot H which receives the hook 24 of the attaching member 20, whereby the wiper blade is operatively connected to the outer end of the oscillating arm F. Before attaching the wiper blade 10 to the arm F, the attaching member 20 is adjusted relative to the length of the wiper blade 10 so that the curved extension 12 enters the rounded corner D of the windshield upon the limit of movement of the wiper in one direction. By adjusting the blade 10 in this manner, the radius of the arc traversed by the wiper blade is increased over that which is obtained by the conventional straight wiper blade. The radius of the arc may be further increased as illustrated in Figure 5 by adding a reversely curved extension portion 27 to the extension portion 12 whereupon the arc traversed by the outer end of the wiper is of a greater radius as indicated by the dot and dash lines M. It will thus be seen that by increasing the radius of the arcuate path of the wiper blade during its oscillatory movement over the glass windshield, the range of optical vision of the operator of an automobile is greatly increased which affords a more sweeping view of the road and scenery ahead. The present use of a straight blade in connection with the curved corners of a windshield restrict the area of the windshield capable of being cleaned by the wiper, and by the use of my invention the driving in rainy or inclement weather is made safer.

In Figure 6 of the drawing, a still further form of angular extension is illustrated for the corner of the windshield may be of a stepped design, and in such case, the wiper extension portion 12' may be of a substantially corresponding shape. I have illustrated the several shapes of extensions to show that my invention is not limited to making the extension of any particular shape for it is intended to substantially conform to the shapes of the inner corner of the windshield into which the extension moves during the limit of the wiper blade in one direction of its oscillatory movement.

In Figure 7 of the drawing, a modified form of adjustable attaching means is illustrated. In this instance, the attaching member 20' is provided with two sets of bolt openings through which bolts 25—25 pass, it being understood that the bolts also pass through the alined slots 18 and 19 in the member 13 and rubber wiper strips 16 and 17. Thumb nuts 28 are threaded to the outer threaded ends of the bolts 25. By the use of thumb nuts, the adjustment of the member 20' may be effected without the use of a screw driver or other implement.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:

1. In combination, a windshield having a substantially rectangular shaped frame provided with a rounded outer corner and a flat glass plate mounted therein, an oscillatable arm pivotally mounted at one side of said windshield, a wiper blade connected to the free end of said arm and disposed in wiping contact with the flat surface of the glass plate, said wiper blade having a straight body portion, and a curved extension portion at the outer end of said straight body portion, the curvature of the curved extension substantially conforming to the curvature of the rounded outer corner of the windshield frame to facilitate movement of the extension portion over the surface of the glass plate and into and out of said rounded corner during oscillatory movement of said arm.

2. In combination, a windshield having a substantially rectangular shaped frame provided with an obtuse angular corner and a flat transparent panel mounted therein, an oscillatable arm having its inner end pivotally mounted on said frame, a wiper blade connected to the free end of said arm and disposed in wiping contact with the flat surface of the transparent panel, said wiper blade having a straight body portion, and an extension portion at the outer free end of the straight body portion and extending at an obtuse angle therefrom, the angularity of the extension portion substantially conforming to the angularity of the angular corner of the windshield frame to facilitate movement of the extension portion over the transparent panel and into and out of the angular corner during oscillatory movement of said arm to wipe the angular corner portions of the transparent panel and to increase the radius of the arcuate area traversed by the wiper blade during its pivotal oscillatory movement over the transparent panel to increase the range of optical vision of a person when looking through the transparent panel.

ALEXANDER C. DE HOFFMANN.